J. J. MACE.
GRAIN CUTTING MACHINE.
APPLICATION FILED OCT. 14, 1914. RENEWED MAR. 11, 1916.
1,188,464.
Patented June 27, 1916.
2 SHEETS—SHEET 1.
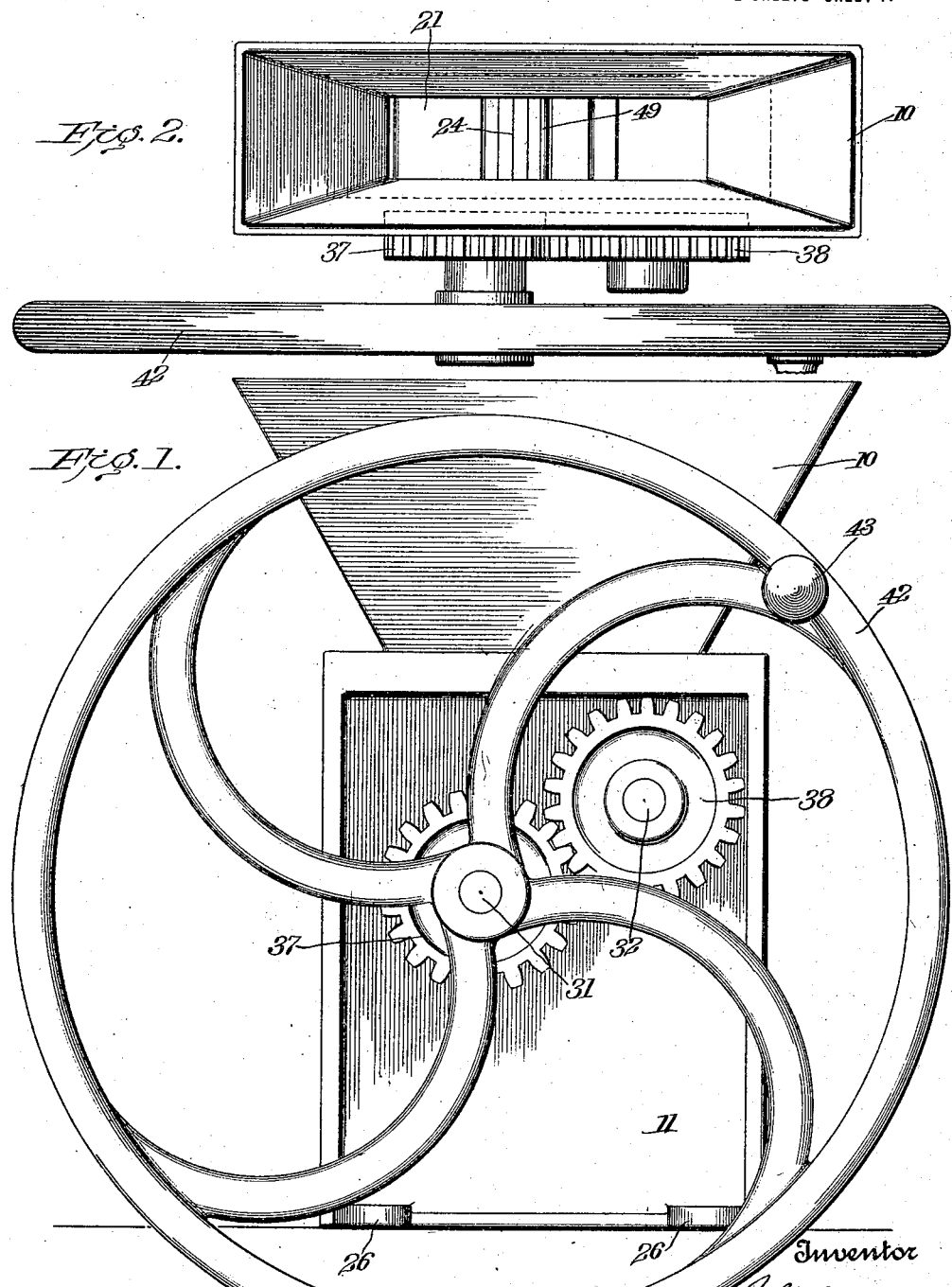

J. J. MACE.
GRAIN CUTTING MACHINE.
APPLICATION FILED OCT. 14, 1914. RENEWED MAR. 11, 1916.
1,188,464.
Patented June 27, 1916.
2 SHEETS—SHEET 2.
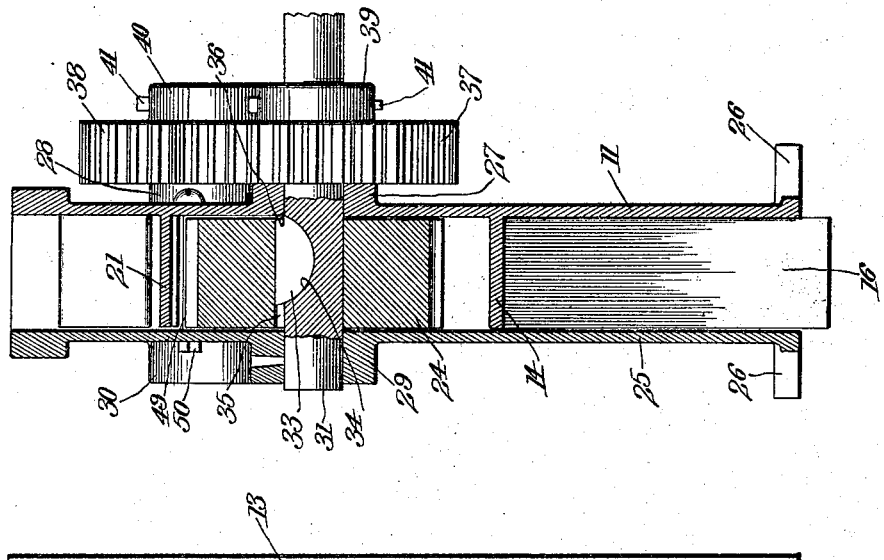
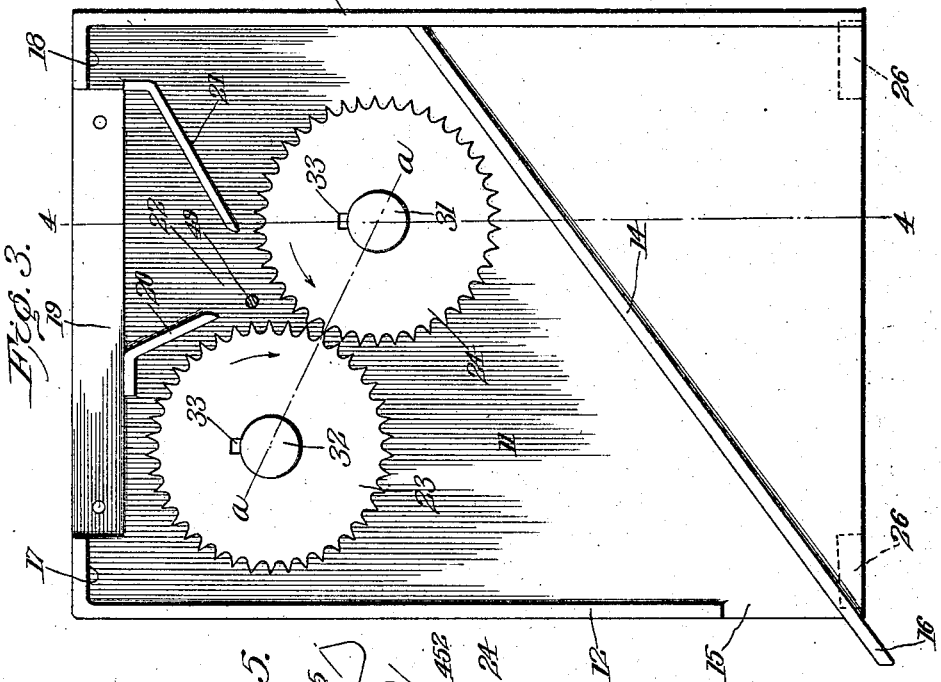

UNITED STATES PATENT OFFICE.

JOHN J. MACE, OF YORK, PENNSYLVANIA.

GRAIN-CUTTING MACHINE.

1,188,464.　　　　　Specification of Letters Patent.　　Patented June 27, 1916.

Application filed October 14, 1914, Serial No. 866,634.  Renewed March 11, 1916.  Serial No. 83,688.

*To all whom it may concern:*

Be it known that I, JOHN J. MACE, a citizen of the United States, residing at York, county of York, State of Pennsylvania, have invented certain new and useful Improvements in Grain-Cutting Machines, of which the following is a specification.

My invention relates to grain cutting machines and more particularly to a machine for cutting corn, wheat and similar grain into two and three parts to provide feed for poultry.

Machines for cracking corn usually crush it so fine and small that it amounts to little as feed and it is one of the objects of this invention to provide a machine which will cut or shear the corn and other grain and leave the heart thereof intact so as to prevent making fine meal and crushing the grain.

Another object of the invention is to provide a simple structure with few parts which will not get out of order.

The above and other objects and the novel features of the invention will be apparent from the following description, taken in connection with the drawings, in which, Figure 1 is a side elevation of a machine embodying my invention; Fig. 2 is a plan view of the same; Fig. 3 is an interior view of the machine; Fig. 4 is a vertical section of the machine taken on the line 4—4 of Fig. 3; and Fig. 5 is a detail view of the cutting members adjacent the point where they pass one another.

Referring to the drawings, the casing of the machine comprises two castings which fit together to inclose the cutting members and support thereon a cast iron hopper 10. Referring to Fig. 3, one of the castings comprising the casing of the machine consists of a plate 11 which forms one side wall of the casing and two plates 12 and 13 integrally joined to the plate 11 to form the end walls of the casing. A plate 14 integrally connected to the plates 11 and 13 and extending at an angle across the inner face of the plate 11 constitutes the bottom wall of the casing and being inclined downwardly also forms a chute to discharge the material from the interior of the casing. The end wall 12 terminates short of the bottom of the casing leaving an opening 15 through which the material may pass, the wall 14 extending through the opening 15 and beyond the plane of the wall 12 forming a lip 16 outside the discharge opening at the lower end of the casing. Flanges 17 and 18 are formed on the interior side of the end walls 12 and 13 to provide supporting surfaces for the hopper 10, the discharge opening of which registers with an inlet opening 19 in the top of the casing.

An auxiliary hopper is formed on the interior of the casing by the two deflecting plates 20 and 21 which are cast integral with the side wall 11 of the casing and are inclined toward one another and leave the space 22 between them which constitutes the discharge opening of the auxiliary hopper. The lateral extensions 12, 13, 14, 17, 18, 20 and 21 on the side wall 11 are of the same width and extend across the interior of the casing and inclose within them a compartment which contains the two coöperating circular cutting members 23 and 24. A cover plate 25 closes the compartment on the side opposite the side 11 and constitutes the other side wall of the casing, the two castings being secured together by suitable bolts or screws. Both castings also are provided with feet 26 at their lower edges on the outer sides thereof whereby they may be fastened to a table or other support.

The wall 11 has two openings therein surrounded by the bosses 27 and 28 and the wall 25 has two similar openings surrounded by the bosses 29 and 30. The bosses are arranged on the exterior sides of the walls and integral therewith. The pair of bosses 27 and 29 provide bearings for the shaft 31 which carries the cutting member 24 and the pair of bosses 28 and 30 similarly provide bearings for the shaft 32 which carries the cutting member 23. The cutting members are each secured to the shaft by a key 33 as shown in Fig. 4, which key fits in a concave slot 34 in the shaft 31 and in a keyway 35 in the cutting member. The end of the key 33 is flattened and the parts are so cut that the flattened end of the key will abut against the inner side of the wall 11 as at 36, thus locking the shafts 31 and 32 against endwise motion toward the right as will be understood from an inspection of Fig. 4.

The shafts 31 and 32 project outwardly beyond the ends of the bosses 27 and 28 and their projecting ends respectively carry the gear wheels 37 and 38 which mesh. Each of the gear wheels 37 and 38 is provided with a projecting hub, 39 and 40, and a pin 41 extends through each of the hubs and through the shaft on which it is mounted to secure the gear wheels 37 and 38 to their respective shafts 31 and 32. The shafts and the parts carried thereby are thus locked against lateral motion in either direction by the pins 41 and the keys 33, whereby collars and similar devices for accomplishing this same purpose are dispensed with and the number of parts of the machine reduced. The shaft 31 extends beyond the hub 39 a short distance so that a drive wheel 42 may be secured thereto. In a power driven machine a pulley may be mounted on the end of the shaft 31. The wheel 42 is provided with the usual handle 43 for driving the same.

The cutting or shearing members 23 and 24 are substantially similar in construction and each consists of a solid circular disk having a thickness practically equal to the width of the interior of the casing, that is between the walls 11 and 25 so that material will not enter between the cutting disk and the walls of the casing to retard the operation of the machine. The peripheral surfaces of the cutting members are provided with transverse parallel grooves 44 throughout. The grooves 44 have concave or rounded bottoms and are located between V-shaped sharp cutting or shearing teeth 45. The grooves and cutting teeth extend entirely across the faces of the cutting members and the members coöperate in the manner shown more clearly in Fig. 5.

As the grain such as corn, for instance, passes down through the discharge opening 22 in the auxiliary hopper it falls into the space between the cutting members 23 and 24 which are revolving in the direction indicated by the arrows. The kernels are caught between the teeth 45 disposed substantially opposite each other on the cutting members 23 and 24 and as the cutting members continue their rotation the coöperating teeth acting like a pair of shears cut an ordinary sized kernel into two parts. For radically different sized grain the size of the teeth and the grooves will of course be changed. The cutting members are so adjusted that certain of the teeth, the pair of teeth 451 and 452 located respectively on the cutting members 23 and 24 and on a line connecting the centers of the latter, will only slightly overlap when passing as shown in Fig. 5. By this arrangement spaces will be left between the coöperating cutting members to receive the pieces of grain cut thereby preventing them from being crushed. For instance in Fig. 5 as the coöperating teeth above the pair of teeth 451, 452 close on a kernel, part of the kernel will drop into the space 47 on one side and part of the kernel will drop into the space 48 on the opposite side, and as the teeth only slightly overlap in passing there will be sufficient space to contain the whole cut pieces so that they will not be crushed and will be delivered from the machine with the heart of the kernel intact and merely the shell of the kernel is cut.

The shaft 32 and the cutting member and gear carried thereby are located in a plane above the shaft 31, cutting member 24 and gear 37 connected therewith. It will be observed that the gear 37 and cutter 24 are the driven members and that the cutter 23 is positively driven through the gear 38 by the gear 37 and does not depend on the cutting member 24 for its drive. However, the cutting teeth on the member 24 overlap the cutting teeth on the member 23 and therefore the positively driven cutter will exert driving action on the idle cutter.

I have found that there is occasionally a tendency for the kernels to clog the cutters where they enter between the teeth, because it sometimes happens that the kernels fall in between the teeth two or three thick and jam the cutters. In order to prevent such clogging of the machine I provide the rod 49 which is located in the space between the discharge opening 22 from the auxiliary hopper and the entrance to the space between the cutters. The rod 49 is secured to the side walls 11 and 25 by means of a nut 50 and serves to separate the kernels and retard their movement into the space between the cutting members.

The machine described cuts grain without crushing it thus preventing considerable waste and providing a food which is much more suitable for poultry. The operation of the machine will be apparent from the foregoing description and it will be seen that it is simple in construction and operation.

While I have described the machine in detail, it is to be understood that I do not wish to be limited to the exact structure shown as various changes within the spirit of the invention may be made.

Having thus described the invention, what is claimed and desired to be secured by Letters Patent is:

1. In a grain cutting machine, a pair of substantially similar coöperating cutting members provided with V-shaped cutting teeth on their peripheral surfaces, and grooves between the teeth having rounded bottoms, the members being adjusted so that certain of the teeth thereof will coöperate to shear the grains and only slightly overlap so that spaces will be left between the coöperating members to receive the pieces of grain and prevent the crushing of the same as they pass between said members.

2. In a grain cutting machine, the combination of a casing comprising side walls, a pair of coöperating cutting members within the casing, said members having teeth adapted to shear grains and having a length substantially equal the distance between said side walls, deflecting means above the cutting members and capable of leading grain to the space between the cutting members, and a chute below the cutting members, and constituting the bottom of said casing, said casing having a discharge outlet therein near the lower end of said chute.

3. In a machine of the class described, the combination of coöperating members, and a supporting and inclosing casing for said members comprising a side wall having its lower end disposed above the bottom of the casing, and an inclined wall extending under and spaced a distance from the lower end of said side wall whereby an outlet spout for said casing is provided near the lower end of said inclined wall.

4. In a machine of the class described, the combination of a pair of coöperating grain dividing members, a casing for said members comprising two castings forming the sides of the casing, an inclined wall integral with one of said castings and constituting the bottom of said casing and providing a chute for grain, one of said side walls having a discharge opening therein above a part near the lower end of said inclined wall.

5. In a grain cutting machine, the combination of a casing, a shaft rotatably mounted in a bearing in a wall of said casing, a cutting device in the casing and mounted on said shaft, a key between said cutting device and shaft and locking the shaft against movement longitudinally in one direction, a wheel on the outer side of said casing and mounted on said shaft, and means for preventing the movement of said wheel longitudinally of the shaft and thereby preventing any motion of the shaft in the opposite direction, whereby end motion of the shaft in either direction is prevented.

6. In a grain cutting machine, the combination of a casing, a pair of coöperating toothed cutting members located in the casing, said cutters having their axes located in different horizontal planes, the teeth of one of said cutters only slightly overlapping the teeth of the other cutter and coöperating therewith to shear the grains, means for directly driving the cutter having the overlapping teeth, and gearing connecting the directly driven cutter and the other cutter.

7. In a grain cutting machine, the combination of a casing having substantially parallel side walls, and a pair of substantially similar coöperating cutting members inside said casing and extending from one side wall to the opposite side wall, each of said members having cutting teeth thereon and concave grooves between the teeth, said members being so adjusted that the teeth only slightly overlap so as to shear the grains and leave sufficient space between the coöperating teeth and members where the members most closely approach each other to prevent a crushing action on the grains, as and for the purpose set forth.

In testimony whereof I affix my signature in presence of two witnesses.

JOHN J. MACE.

Witnesses:
V. K. KEESEY,
MABEL EVANS.